United States Patent [19]
Fountaine

[11] Patent Number: 6,033,158
[45] Date of Patent: Mar. 7, 2000

[54] SMALL-SHANK TOOL FOR AUTOMATIC LATHES

[76] Inventor: William R. Fountaine, 12 Rampart Ct., Holyoke, Mass. 01040

[21] Appl. No.: 09/036,346

[22] Filed: Mar. 6, 1998

Related U.S. Application Data

[63] Continuation-in-part of application No. 08/632,347, Apr. 10, 1996, Pat. No. 5,779,400.

[51] Int. Cl.⁷ .................................................. B23B 27/16
[52] U.S. Cl. ............................ 407/103; 407/66; 407/104
[58] Field of Search ............................ 407/66, 102–104, 407/1.7

[56] References Cited

U.S. PATENT DOCUMENTS 5,779,400   7/1998   Fountaine ................................. 407/103

OTHER PUBLICATIONS

Engineered Tooling Corporation Catalogue, "Mini–Shank Tooling Indexable Inserts", 1990.
Kennametal, Inc., "Lathe Tooling for Swiss Style Turning Centers", Catalog 4004, 1994.
Max Bar™ Brand Catalogue, "Tool Holders and Inserts for CNC 'Swiss–Type' Automatics", 1992.
Micro 100, Inc., "Super Carbide Tools", Catalog 952, 1995.
Tornos Bechler S.A., "General Catalog"(no date).

*Primary Examiner*—Steven C. Bishop
*Attorney, Agent, or Firm*—Cummings and Lockwood

[57] ABSTRACT

In a small-shank cutting tool for an automatic lathe or like turning machine, the tool shank defines at least one tool-supporting region having a width of less than 9 mm on a tool-supporting end of the shank. The tool-supporting region defines a tool recess formed by two tool-supporting surfaces oriented at an acute angle relative to each other. A rhomboidal-shaped tool insert of the cutting tool is seated within the tool recess of the shank with two sides of the insert each engaging a respective tool-supporting surface of the shank, and a substantial portion of the other two sides of the insert extending beyond the end of the shank and forming a cutting tip for cutting a workpiece. The rhomboidal-shaped insert defines an inscribed circle having a diameter less than approximately 6 mm, and a fastener aperture extending through the approximate center of the inscribed circle defining a diameter less than that of the inscribed circle, in order to provide sufficient space on the tool-supporting region of the shank to form at least two supporting surfaces for engaging and supporting the rhomboidal insert along a substantial portion of each of two sides. A threaded fastener of the cutting tool extends through the fastener aperture and is threadedly attached to the tool shank for fixedly attaching the tool insert to the tool shank. The threaded fastener is preferably a counter-sunk torque screw, and defines a maximum head diameter less than approximately 70% of the diameter of the inscribed circle in order to maintain sufficient structural integrity of the insert to avoid failure during machining operations.

17 Claims, 4 Drawing Sheets

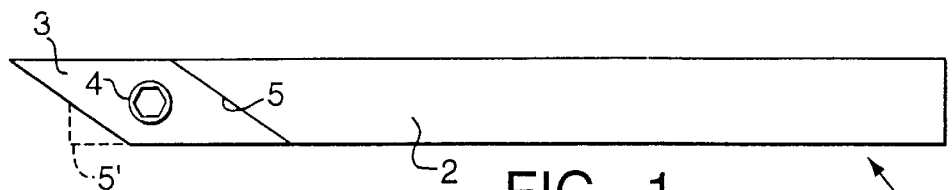
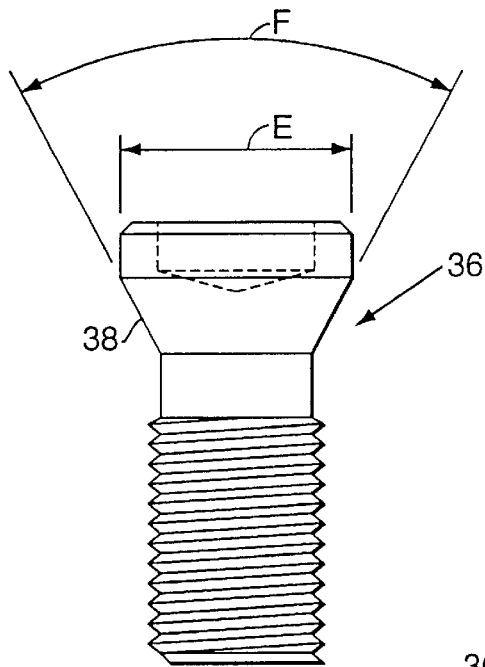
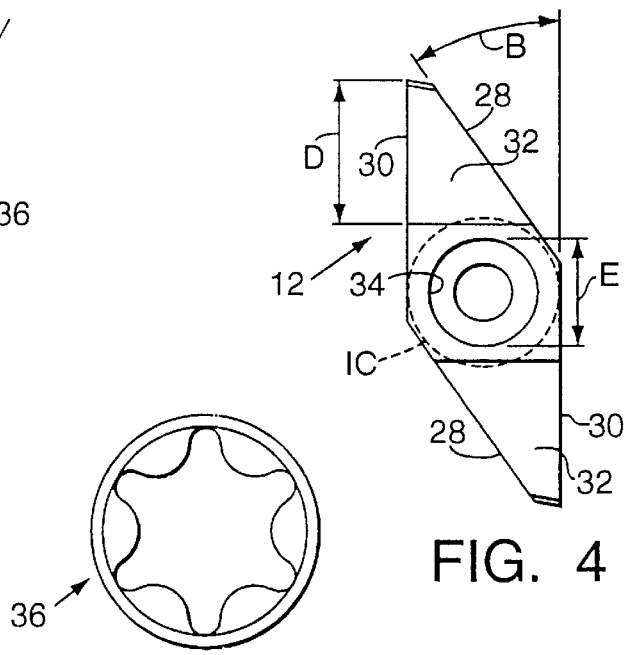
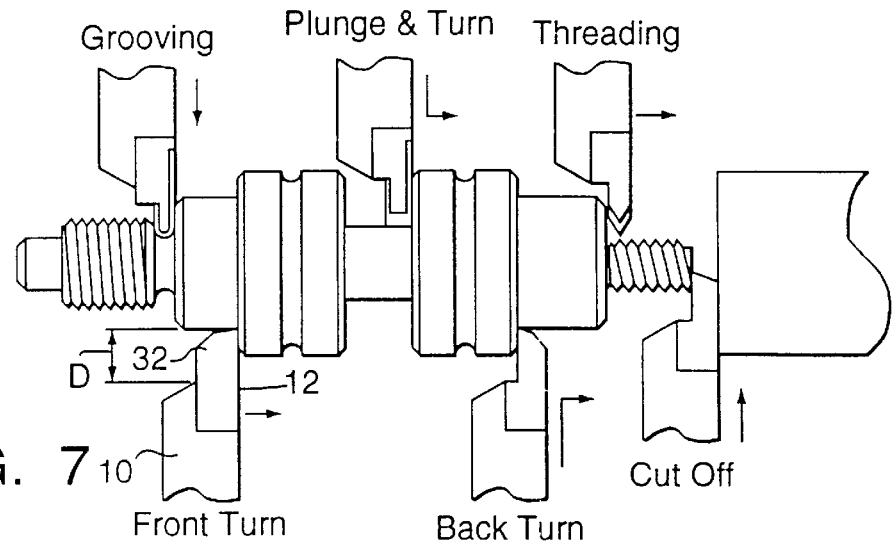

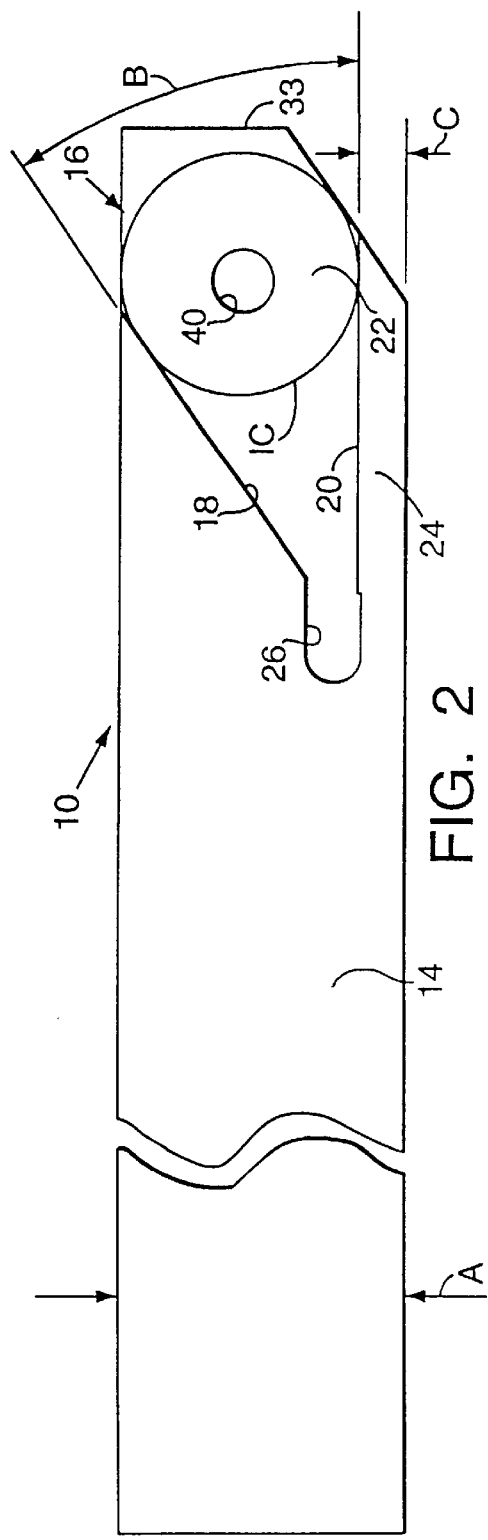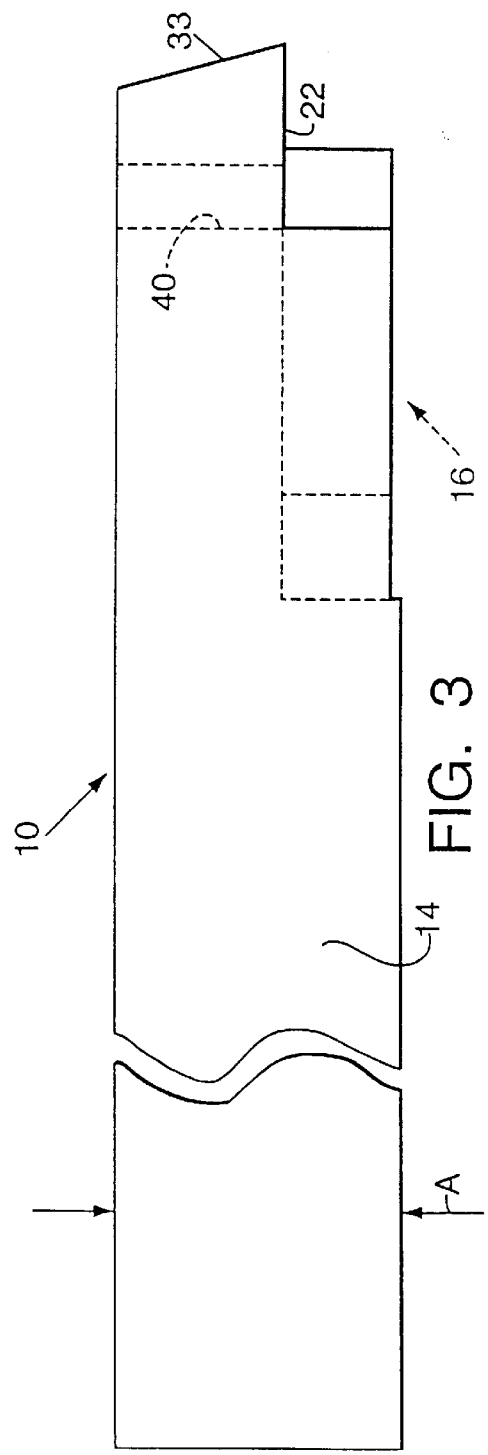

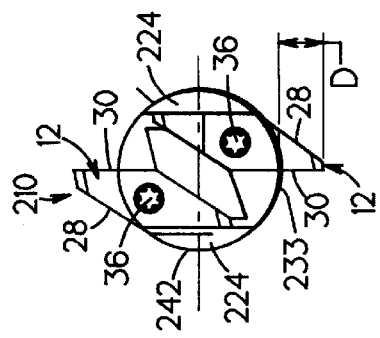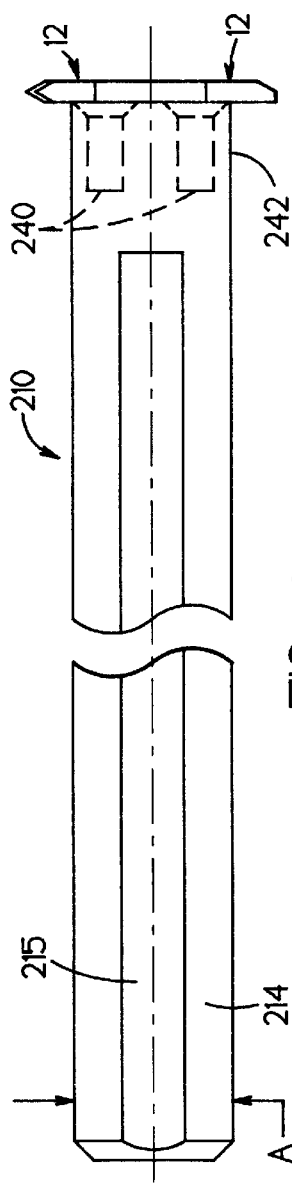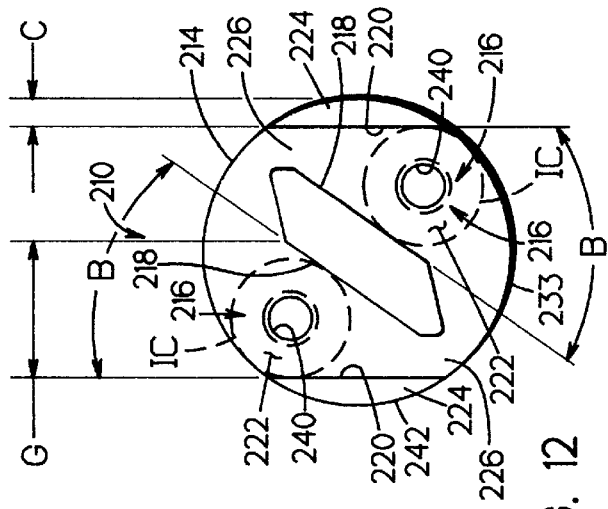

SMALL-SHANK TOOL FOR AUTOMATIC LATHES

CROSS REFERENCE TO RELATED APPLICATION

This patent application is a continuation-in-part of U.S. patent application Ser. No. 08/632,347, filed Apr. 10, 1996, now U.S. Pat. No. 5,779,400.

FIELD OF THE INVENTION

The present invention relates to cutting tools for automatic lathes, and more particularly, to such cutting tools having an interchangeable tool insert attached to a shank with the insert defining a generally rhomboidal shape and having a cutting surface extending beyond the tip of the shank for cutting a workpiece, and particularly suited for use with small-shank cutting tools having shanks or tool-supporting regions on the shanks which are less than 9 mm in width.

BACKGROUND INFORMATION

In a typical Swiss-type automatic screw machine, a plurality of cutting tools are radially disposed about a sliding headstock for cutting a workpiece which is rotatably and longitudinally driven relative to the tools. The cutting tools are typically comprised of a tool bit or insert attached to a tool holder or shank, and the shanks are selectively actuated to move the tools radially into and out of engagement with a workpiece to cut the workpiece as desired.

The tool shanks are typically made of rectangular-shaped bars which are slidably mounted within corresponding channels formed in a tool turret or gauge plate mounted around or above the headstock. The tool shanks are provided in the following industry-standard widths: 7 mm, 8 mm, 10 mm, 12 mm, 5/16 inch, and ½ inch. Most smaller automatic screw machines can accommodate only the 7 and 8 mm width shanks (referred to herein as "small-shank" cutting tools), whereas the larger automatic screw machines use the shanks having widths of 10 mm or larger.

Cutting tools having a shank width of 8 mm or larger are commercially available in several different configurations. In one type, the carbide tool bits are brazed to the ends of the shanks. In another type, interchangeable carbide tool inserts are screwed or clamped to the ends of the shanks. One advantage of the brazed cutting tools, is that they are relatively less expensive to manufacture and the tool bits are strongly secured in place. One advantage of the interchangeable tool inserts, on the other hand, is that the inserts are provided with more than one cutting edge so that when each edge becomes worn, chipped or otherwise requires replacement, the tool insert may be relatively quickly rotated or indexed on the shank by adjusting the fastener or clamp to position a fresh cutting edge of the insert into a cutting position. The clamping mechanisms may provide a secure lock; however, they are relatively bulky and may not always be easily mounted within the screw machines, particularly the machines requiring small-shank tools, and therefore may require additional set-up time and installation expense.

Currently, most cutting tool manufacturers provide the same series of tool inserts for use with each of the respective manufacturer's available shanks. In addition, most manufacturers only provide interchangeable tool inserts for tools having shank widths of 10 mm or larger. For cutting tools having shank widths of less than 10 mm, these manufacturers recommend the use of brazed tools, as described above.

One drawback of the brazed tools, however, is that once the tool bits become worn, they must be ground to reform the cutting edges, or the entire tools must be replaced, and the machine must be reset to accept the re-ground tool. The inventor of this application is not aware of any manufacturer that has provided cutting tools with interchangeable inserts for shank widths of less than 8 mm, and he is aware of only one manufacturer that has provided cutting tools with interchangeable inserts for shank widths of 8 mm.

Referring to FIG. 1, a typical such commercially-available cutting tool is indicated generally by the reference numeral 1. The cutting tool 1 includes a rectangular-shaped shank 2 having a width of 8 mm, and a rhomboidal-shaped (or diamond-shaped) insert 3 attached to one end of the shank by a screw 4. As can be seen, the tool insert 3 is defined by an inscribed circle which is approximately equal to the width of the shank 2 (8 mm), and the shank defines a single tool-supporting edge 5 for engaging and supporting a corresponding edge of the tool insert. One of the problems encountered with this configuration is that if the insert is torqued in the clockwise direction in FIG. 1, the tool insert may become relatively easily dislodged on the shank, thus rendering the cutting tool ineffective and requiring time-consuming breakdown and set-up to either repair or replace the tool.

As illustrated in broken lines in FIG. 1, industry has attempted to overcome this problem by providing the shank with another, smaller supporting edge 5' on the opposite side of the tool insert relative to the first supporting edge 5. However, because of the size and location of the second supporting edge, it provides little additional support and has proven to break away relatively easily, and otherwise has failed to effectively prevent the insert from being dislodged when torqued in the clockwise direction in FIG. 1.

Accordingly, the prior art has failed to provide an acceptable small-shank cutting tool and interchangeable, rhomboidal-shaped tool inserts therefor, and it is an object of the present invention to provide such cutting tools and inserts therefor which overcome the drawbacks and disadvantages of the above-described prior art.

SUMMARY OF THE INVENTION

The present invention is directed to both a small-shank cutting tool for an automatic lathe, and to a rhomboidal-shaped tool insert therefor. The cutting tool comprises a tool shank which, in one embodiment, defines a rectangular cross-sectional shape having a maximum width of less than approximately 9 mm, and preferably either 7 mm or 8 mm, and including a tool recess defined at one end of the shank by two tool-supporting surfaces oriented at an acute angle relative to each other. One of the tool-supporting surfaces is generally parallel to an adjacent side of the shank, and the shank defines an elongated body portion extending between the respective tool-supporting surface and side of the shank having a thickness of at least approximately 1.0 mm for enhancing the structural integrity of the respective tool-supporting surface.

A rhomboidal-shaped tool insert of the cutting tool is seated within the tool recess of the shank with two sides of the insert each engaging a respective tool-supporting surface, and a substantial portion of the other two sides of the insert extending beyond the end of the shank and forming a cutting tip for cutting a workpiece. The rhomboidal-shaped insert defines an inscribed circle having a diameter less than approximately 90% of the maximum shank width (or the tool-supporting end region of the shank), and a fastener aperture extending through the approximate center of the inscribed circle defining a diameter less than approximately 70% of the diameter of the inscribed circle. A threaded fastener of the cutting tool extends through the fastener aperture and is threadedly attached to the tool shank for fixedly attaching the tool insert to the tool shank. The threaded fastener defines a counter-sunk head having a maximum diameter less than approximately 70% of the diameter of the inscribed circle, in order to maintain sufficient structural integrity of the insert to avoid failure during machining operations.

One advantage of the present invention is that an interchangeable, rhomboidal-shaped insert may be used with either 7 mm or 8 mm width shanks, and the shank engages and supports such inserts along a substantial portion of two sides of the insert to fixedly secure the insert and prevent the insert from being dislodged or rendered defective in a like manner as encountered with the prior art small-shank cutting tools described above.

Another advantage of the present invention is that two interchangeable tool inserts may be mounted on the same end of a common shank, which in turn may be adapted for mounting on a gang plate or like tool holder for a gang-tool lathe or other turning machine. The two inserts may be configured to perform the same machining operation, or different machining operations, to thereby significantly increase the number of tool inserts that may be simultaneously mounted on a common gang plate or other tool-holding device.

Other objects and advantages of the present invention will become apparent in view of the following detailed description and accompanying drawings.

BRIEF DESCRIPTION OF THE DRAWINGS

FIG. 1 is a side plan view of a prior art cutting tool having an 8 mm width shank and an interchangeable tool insert.

FIG. 2 is a side plan view of a shank or tool holder of a cutting tool embodying the present invention.

FIG. 3 is a top plan view of the shank of FIG. 2.

FIG. 4 is a side plan view of an interchangeable tool insert embodying the present invention for attachment to the shank of FIGS. 2 and 3.

FIG. 5 is an elevational view of a threaded fastener embodying the present invention for attaching the interchangeable insert of FIG. 4 to the shank of FIGS. 2 and 3.

FIG. 6 is a top plan view of the threaded fastener of FIG. 5.

FIG. 7 is a partial-schematic, elevational view of several different configurations of the cutting tool of the present invention illustrating several exemplary types of machining operations that may be performed with the different configurations.

FIG. 10 is a top plan view of another embodiment of a cutting tool employing a pair of interchangeable tool inserts embodying the invention.

FIG. 11 is a front plan view of the cutting tool of FIG. 10.

FIG. 12 is an enlarged, front plan view of the shank of the cutting tool of FIG. 10 without the interchangeable tool inserts mounted thereon.

DETAILED DESCRIPTION OF THE PREFERRED EMBODIMENTS

Figure 8:
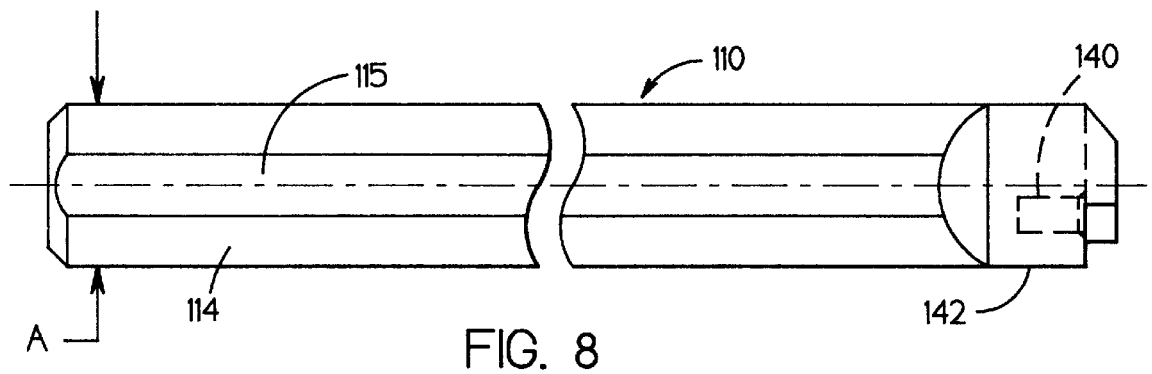
FIG. 8 is a top plan view of another embodiment of a shank for holding the interchangeable tool inserts of the invention.

In FIGS. 2 and 3, a typical tool holder or shank embodying the present invention is indicated generally by the reference numeral 10. The shank 10 is adapted to hold one or more interchangeable tool inserts, shown typically at 12 FIG. 4, for use in an automatic screw machine, and is particularly suitable for use in "small-shank" screw machines that can only accommodate shanks having widths of less than 9 mm. Currently, the industry standard shank widths for such "small-shank" machines are 7 mm and 8 mm.

As shown in FIG. 2, the shank 10 defines an elongated or longitudinally-extending body 14 having a rectangular cross-sectional configuration. In the embodiment of the present invention illustrated, each of the four sides of the body 14 define an equal width "A" forming a square cross section. One end of the body 14 of the shank defines a tool recess 16 for receiving and supporting a tool insert 12 (FIG. 4), as is described further below. The recess 16 is defined by a first tool-supporting surface 18, a second tool-supporting surface 20, and a base surface 22 extending between the first and second surfaces and oriented normal to these surfaces. As shown in FIG. 2, the first and second tool-supporting surfaces 18 and 20 are oriented at an acute angle "B" relative to each other, and the outermost end of each tool-supporting surface is oriented tangential to an inscribed circle "IC" defined by each tool insert 12 (FIG. 4).

As can be seen in FIG. 2, the first and second tool-supporting surfaces 18 and 20 are positioned on the body 14 so as to define an elongated lip or supporting body section 24 behind the second tool-supporting surface 20 and having a thickness "C". In order to provide adequate support for the tool insert when received in the recess 16 and to otherwise ensure the structural integrity of the cutting tool, the thickness C of the lip 24 is preferably at least approximately 1.0 mm for a shank having a width A of approximately 7 mm, and may be thicker for larger-width shanks. As also shown in FIG. 2, the shank 10 defines a relief pocket 26 formed at the innermost ends of the first and second tool-supporting surfaces 18 and 20.

Turning to FIG. 4, the interchangeable tool insert 12 has four sides forming a substantially rhomboidal or diamond shape, including two parallel first sides 28 and two parallel second sides 30. Each first side 28 of the insert is oriented at an acute angle B relative to a respective second side 30, and the adjacent pairs of first and second sides each form a respective cutting tip 32 having a depth "D", as shown in FIG. 4. Each cutting tip 32 defines one or more respective cutting edges which are shaped and configured in accordance with the particular type of machining operation to be performed, as is described further below. For example, as shown in FIG. 4, a chamfer is formed at the juncture of each respective pair of first and second surfaces 28 and 30, respectively. The tool insert 12 is preferably made of carbide steel, but may equally be made of other desired materials.

The angle B of the tool insert shown in FIG. 4 is the same as the angle B of the shank shown in FIG. 2 so that when the insert is received within the recess 16 of the shank, the respective first and second surfaces 28 and 30 are seated in conforming engagement with the first and second tool-supporting surfaces 18 and 20 of the shank, respectively, to securely support the insert on two sides. In the embodiment of the present invention illustrated, the angle B is approximately 35°; however, as will be recognized by those skilled in the pertinent art, this angle may be changed as desired depending upon the requirements of a particular cutting tool design or other machining system. When the tool insert 12 is received within the recess 16 of the shank, preferably substantially the entire depth D of the respective cutting tip 32 extends beyond the end surface 33 of the shank (FIGS. 2 and 3), as is described further below.

As shown in broken lines in FIG. 4, the insert 12 defines an inscribed circle "IC", which is defined by the diametrical distance between either the opposing first sides 28 or the opposing second sides 30 of the insert. In the embodiment of the present invention illustrated, the tool insert 12 is designed for tool shanks having a width A of 7 mm or greater (FIGS. 2 and 3), and therefore the diameter of the inscribed circle IC is approximately 6 mm. Accordingly, in a shank 10 having a width of 7 mm, the thickness C of the supporting lip 24 is approximately 1 mm, and in larger-width shanks the thickness C may be greater. In accordance with the present invention, for such small-width shanks (i.e., 8 mm or less), the diameter of the inscribed circle IC should be no more than approximately 90% of the width A of the shank, and for 7 mm shanks, the diameter of the inscribed circle IC is preferably approximately 86% or less of the shank width, in order to ensure that the lip 24 has sufficient thickness and structural integrity to fixedly support the tool insert during machining operations. Accordingly, the diameter of the inscribed circle IC is preferably within the range of approximately 5.5 mm to 6.5 mm for shanks having a width within the range of approximately 7 mm to 8 mm.

As also shown in FIG. 4, the tool insert 12 defines a counter-sunk aperture 34 extending through the approximate center of the inscribed circle IC for receiving a threaded fastener 36 (FIG. 5) to fixedly attach the insert to the shank. The counter-sunk aperture 34 defines a maximum diameter E which is sufficiently less than the diameter of the inscribed circle IC of the insert to maintain its structural integrity. As shown in FIG. 5, the threaded fastener 36 is preferably a counter-sunk torque screw defining a maximum head diameter E, which is approximately the same as the maximum diameter E of the counter-sunk aperture 34 of the tool insert. In this embodiment of the invention, wherein the tool insert defines an inscribed circle IC having a diameter of approximately 6 mm, the diameter E should be no more than approximately 4 mm, and is preferably approximately 3.5 mm. However, as will be recognized by those skilled in the pertinent art, the diameter E may be changed as required depending upon the inscribed circle of the insert. In accordance with the present invention, for tool inserts having an inscribed circle IC of approximately 6 mm or less, the diameter E should be no more than approximately 70% of the diameter of the inscribed circle. Similarly, for the insert of the invention wherein the diameter of the inscribed circle IC is within the range of approximately 5.5 mm to 6.5 mm for shank widths within the range of approximately 7 mm to 8 mm, the maximum head diameter E will be within the range of approximately 3 mm to 4.5 mm depending upon the specific minimum shank width and inscribed circle selected.

Also with reference to FIG. 5, in this embodiment of the invention the angle F of the conical-shaped surface 38 of the fastener head is approximately 60° (the "counter-sink angle"); however, as will be recognized by those skilled in the pertinent art, this angle may be changed within limits depending upon the requirements of a particular cutting tool design or other machining system. In accordance with the present invention, the angle F is preferably within the range of approximately 52° to 68° to minimize the overall head diameter. As will also be recognized by those skilled in the pertinent art, the surface angle of the counter-sink aperture 34 is selected to substantially match the angle F of the fastener 36 and is preferably configured so that when the fastener is received within the aperture and threadedly engaged with the shank, the top of the fastener is at approximately the same level as the top edge of the aperture.

As shown in FIGS. 2 and 3, the shank 10 defines a threaded bore 40 for threadedly receiving the fastener 36 upon attachment of the tool insert 12 to the shank. The threads of the fastener and bore are preferably relatively fine, and in the preferred embodiment illustrated a "M2.5-4H" thread is employed (2.5 mm pitch×4 threads per mm). Accordingly, the tool insert 12 is seated within the recess 16 of the shank with a respective first side 28 of the insert engaging the first tool-supporting surface 18, and the adjacent second side 30 of the insert engaging the second tool-supporting surface 20 of the shank. The fastener 36 is then inserted through the counter-sunk aperture 34 of the insert and threadedly engaged within the threaded bore 40 of the shank to fixedly secure the insert to the shank.

As mentioned above, the cutting tip 32 of each insert 12 may take any of several different shapes and/or configurations, depending upon the type of machining operation to be performed. For example, as shown typically in FIG. 7, the cutting tip 32 of the insert 12 may be ground or otherwise shaped in the several different configurations shown to perform front turning, back turning, cut off, threading, plunge and turning, and grooving operations. On the upper side of the workpiece in FIG. 7, the three exemplary cutting tools of the invention are shown in bottom plan view, whereas on the lower side of the workpiece the three cutting tools are shown in top plan view.

One advantage of the cutting tool of the present invention is that because the diameter of the inscribed circle IC is preferably less than approximately 6 mm, for small-width shanks having a width of 8 mm or less, there is sufficient space to one side of the tool insert when attached to the shank to provide a second tool-supporting surface and lip for engaging and supporting the rhomboidal insert on two sides. Accordingly, the problems associated with the prior art small-shank cutting tools with interchangeable inserts are substantially avoided.

As may be recognized by those skilled in the pertinent art based on the teachings herein, the interchangeable tool inserts of the invention may be used with any of a plurality of different types of shanks having different shank configurations and widths, and may be used in other types of metal-working machinery, such as gang-tool lathes, chuckers or like automated turning machines. In addition, as described in further detail below, a plurality of interchangeable tool inserts may be mounted on the tool-supporting end of a larger-width shank (e.g., a ⅝ inch shank) without having to increase the overall width of the tool-supporting end of the shank by forming a "club foot" or like expanded-width mounting portion.

Figure 9:
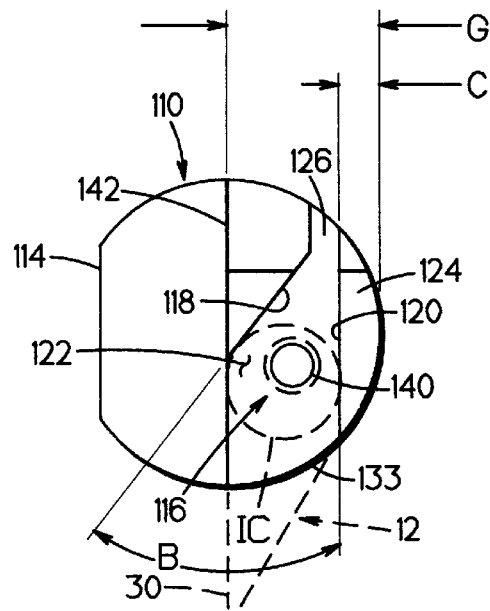
FIG. 9 is an enlarged, front plan view of the shank of FIG. 8.

Turning to FIGS. 8 and 9, another tool holder or shank adapted for use with the tool inserts of the invention is indicated generally by the reference numeral 110. The shank 110 is designed for use in a gang-tool lathe, chucker, or like turning machine, and is particularly suitable for mounting on a gang plate (also referred to as a gang-tool holder) or other device for mounting the tools in such machinery. The shank 110 is constructed for receiving and supporting an interchangeable tool insert 12 (as shown in phantom in FIG. 9), and therefore includes a tool-supporting end defining the same material features of the invention as the shank 10 described above with reference to FIGS. 2 and 3.

Accordingly, like reference numerals preceded by the numeral 1 are used to indicate like elements.

As shown in FIG. 8, the shank 110 defines an elongated or longitudinally-extending body 114 having a generally circular cross-section, and a longitudinally-extending flat 115 for securing and preventing rotation of the shank when mounted on a gang plate or other tool-mounting device. As shown best in FIG. 9, the tool-supporting end of the shank 110 defines a tool recess 116 for receiving and supporting an interchangeable tool insert 12 of the invention (shown in phantom). The tool recess 116 is formed by a first tool-supporting surface 118, a second tool-supporting surface 120 oriented at an acute angle "B" relative to the first tool supporting surface 118, and a base surface 122 extending between the first and second tool-supporting surfaces and oriented normal to those surfaces. As indicated in broken lines in FIG. 9, the outer end of each tool-supporting surface 118 and 120 is oriented tangential to the inscribed circle IC of each tool insert 12 received in the tool recess 116.

Also like the shank 10 described above, the tool-supporting end of the shank 110 further defines an elongated lip or supporting body section 124. The elongated lip 124 is formed between the second tool-supporting surface 120 and the adjacent side of the tool-supporting end of the shank and defines a maximum thickness "C". As described above, in order to provide adequate support for the tool insert when received in the recess 116 and otherwise to ensure the structural integrity of the cutting tool, the maximum thickness C of the lip 124 is at least approximately 1.0 mm. As also shown in FIG. 9, the shank 110 defines a relief pocket or channel 126 formed at the innermost ends of the first and second tool-supporting surfaces 118 and 120.

In the embodiment of FIGS. 8 and 9, the diameter "A" of the body 114 of the shank 110 is approximately 0.6245 inch, and therefore the shank 110 defines a relatively large width (or cross-sectional thickness) in comparison to the shank 10 described above. However, if desired, the tool-supporting end of the shank 110 may be defined by a relatively narrow-width portion 142. One advantage of the narrow-width tool-supporting end 142 is that it facilitates gripping and removing the tool from a gang plate or like tool-mounting device.

As shown in FIG. 9, a maximum width "G" is defined between the outermost end of the first tool-supporting surface 118 and the opposite side of the elongated body portion 124 (which, in this embodiment, is also equal to the maximum width of the tool-supporting end region of the shank). The outermost end of the first tool-supporting surface 118 is coincident with, or terminates at the adjacent side of the tool-supporting end 142, and therefore is also coincident with the center-line of the shank. This is necessary so that when the tool insert 12 is received within the tool recess 116, as shown in phantom in FIG. 9, the upper cutting edge 30 of the tool insert is aligned with the centerline of the shank, and therefore is also aligned with the centerline of the spindle when mounted in a gang plate in a gang-tool lathe, chucker or like turning machine. Accordingly, the width G is equal to approximately ½ the overall thickness A of the shank (about 0.312 inch or 8 mm), and the maximum width C of the elongated lip 124 is approximately 2 mm. Thus, in accordance with the teachings of the invention as set forth above, the maximum width C is greater than about 1 mm (in the illustrated embodiment the width C is about 2 mm), and therefore has sufficient thickness and structural integrity to fixedly support the tool insert during machining operations. In addition, as further taught by the disclosure above, the diameter of the inscribed circle IC of the tool insert 12 (FIG. 4) is less than approximately 90% of the width G, and the diameter of the fastener aperture 34 extending through the center of the inscribed circle is less than approximately 70% of the diameter of the inscribed circle.

The angle B formed between the first and second tool-supporting surfaces 118 and 120 (FIG. 9) is the same as the angle B of the tool insert 12 shown in FIG. 4 so that when the insert is received within the tool recess 116 of the shank, the respective first and second surfaces 28 and 30 are seated in conforming engagement with the first and second tool-supporting surfaces 118 and 120 of the shank, respectively, to securely support the insert on two sides. In the embodiment of the present invention illustrated, the angle B is approximately 35°; however, as will be recognized by those skilled in the pertinent art, this angle may be changed as desired depending upon the requirements of a particular cutting tool design or other machining system. When the tool insert 12 is received within the tool recess 116 of the shank, preferably substantially the entire depth D of the respective cutting tip 32 extends beyond the end surface 133 of the shank (FIG. 9) in the same manner as described above with reference to the previous embodiment.

As shown in FIGS. 8 and 9, the shank 110 defines a threaded bore 140 for threadedly receiving the fastener 36 (FIG. 5) upon attachment of the tool insert 12 to the shank. Accordingly, as shown in broken lines in FIG. 9, the tool insert 12 is seated within the tool recess 116 of the shank with a respective first side 28 of the insert engaging the first tool-supporting surface 118, and the adjacent second side 30 of the insert engaging the second tool-supporting surface 120 of the shank. The fastener 36 is then inserted through the counter-sunk aperture 34 of the insert and threadedly engaged within the threaded bore 140 of the shank to fixedly secure the insert to the shank.

The shank of FIGS. 8 and 9 is a left-handed configuration. However, as will be recognized by those skilled in the pertinent art based on the teachings herein, the corresponding right-handed version is a mirror image of the left-handed version shown.

Turning to FIGS. 10 through 12, a shank for another cutting tool embodying the invention is indicated generally by the reference numeral 210. The primary difference between the shank 210 and the shank 110 described above, is that the shank 210 is adapted to receive two tool inserts 12 mounted on the tool-supporting end of the shank, which in turn permits two cutting tool inserts to be mounted in each tool station of a gang plate or like tool-holding device in a gang-tool lathe, chucker or other turning machine. Otherwise, the shank 210 includes the same material features of the invention as the shank 110 described above, and therefore like reference numerals preceded by the numeral "2" instead of the numeral "1" are used to indicate like elements.

As shown in FIG. 10, the shank 210 defines an elongated or longitudinally-extending body 214 having a generally circular cross-section, and a longitudinally-extending flat 215 for securing and preventing rotation of the shank when mounted in a gang plate or like tool-holding device. As shown in FIGS. 11 and 12, the tool-supporting end 242 of the shank defines a pair of tool recesses 216 formed on opposite sides of the centerline of the shank relative to each other. On each side of the centerline, each tool recess 216 is formed by a first tool-supporting surface 218, a second tool-supporting surface 220 oriented at an acute angle "B" relative to the respective first tool supporting surface 218, and a base surface 222 extending between the respective first and second tool-supporting surfaces and oriented normal to those surfaces. As indicated in broken lines in FIG. 12, the outer end of each tool-supporting surface 218 and 220 is oriented tangential to the inscribed circle IC of the tool insert 12 received within the respective tool recess 216.

Like the shanks 10 and 110 described above, the tool-supporting end 242 of the shank 210 defines a pair of elongated lips or supporting body sections 224 formed on opposite sides of the tool-supporting end relative to each other. In accordance with the invention, each elongated lip 224 defines a maximum thickness "C" which is at least approximately 1.0 mm in order to provide sufficient thickness and structural integrity to fixedly support the respective tool insert 12 during machining operations.

Also like the embodiments described above, a maximum width "G" is defined for each tool-supporting region on the end of the shank, and extends between the outermost end of each first tool-supporting surface 218 (which is coincident with the centerline of the shank) and the opposite side of the respective elongated lip 224. In the embodiment of the invention illustrated, the maximum width G of each of the two tool-supporting regions of the shank is equal to approximately ½ the overall thickness A of the shank (about 0.312 inch or 8 mm), and therefore is less than 9 mm. Accordingly, as further taught by the disclosure above, the diameter of the inscribed circle IC of the tool insert 12 (FIG. 4) is less than approximately 90% of the width G, and the diameter of the fastener aperture 34 extending through the center of the inscribed circle is less than approximately 70% of the diameter of the inscribed circle.

As described above, the outer end of each first tool-supporting surface 218 is coincident with, or terminates at the centerline of the shank. Accordingly, as shown in FIG. 11, the construction of the tool-supporting surfaces ensures that the upper cutting edge 30 of both tool inserts 12 (which may be viewed as the inner cutting edges in FIG. 11) are aligned with the centerline of the shank when received and supported in the tool recesses 216 (FIG. 11), and thus are aligned with the centerline of a spindle when mounted on a gang plate in a gang-tool lathe, chucker or other turning machine. Thus, as shown in FIG. 11, the two inserts are rotatably positioned 180° relative to each other, but the cutting edges 30 of the insert pair are aligned with each other and with the centerlines of the shank and spindle.

The angle B formed between each of the first and second tool-supporting surfaces 218 and 220 (FIG. 12) is the same as the angle B of the respective tool insert 12 received therein so that the first and second surfaces 28 and 30 of each insert are seated in conforming engagement with the respective first and second tool-supporting surfaces 218 and 220 of the shank, respectively, to securely support each insert on two sides. In the embodiment of the present invention illustrated, each angle B is approximately 35°; however, as will be recognized by those skilled in the pertinent art, the angles of the two inserts (and tool recesses) may be different, or each angle may be changed as desired depending upon the requirements of a particular cutting tool design or other machining system. When each tool insert 12 is received within the corresponding tool recess 216 of the shank, preferably substantially the entire depth D of the respective cutting tip 32 extends beyond the end surface 233 of the shank (FIG. 11) in the same manner as described above with reference to the previous embodiments.

As shown in FIGS. 11 and 12, the shank 210 defines a relief pocket or channel 226 formed at the innermost ends of each pair of first and second tool-supporting surfaces 218 and 220, respectively. In addition, the shank 210 defines a threaded bore 240 extending into the base surface 222 of each recess 216 for threadedly receiving the fasteners 36 (FIG. 5) upon attachment of the tool inserts 12 to the shank. Accordingly, as shown in FIG. 11, each tool insert 12 is seated within the respective recess 216 of the shank with a first side 28 of each insert engaging the respective first tool-supporting surface 218, and the adjacent second side 30 of the insert engaging the respective second tool-supporting surface 220 of the shank. Each fastener 36 is then inserted through the respective counter-sunk aperture 34 of the insert and threadedly engaged within the respective threaded bore 240 of the shank to fixedly secure each insert to the shank.

The double-insert configuration of FIGS. 8–12 is particularly advantageous for cutting tools used in gang-tool lathes, chuckers or other turning machines having gang plates or similar tool-holding devices. Commercially-available gang plates are typically designed to hold two, four, six or eight tools. However, with the cutting tool of the invention as shown in FIGS. 10–12, the number of cutting tool inserts simultaneously mounted on a commercially-available gang plate may be significantly increased over systems employing prior art interchangeable tools. Each station of the gang plate which is designed to hold only one shank, may nevertheless hold two cutting tool inserts in the manner shown in FIGS. 10–12. Thus, the number of cutting tools simultaneously mounted on each gang plate may be substantially increased, and possibly doubled in comparison to gang-tool lathes, chuckers or like turning machines employing the prior art cutting tools having only one tool bit or insert on each shank.

Yet another advantage of the cutting tools and interchangeable inserts of the invention is that two inserts each may be mounted on a respective tool-supporting region formed on the end of a shank, as shown in FIGS. 10–12, without increasing the width, or otherwise expanding the tool-supporting end of the shank. With prior art interchangeable tool inserts having significantly larger dimensions, on the other hand, a pair of such inserts could not be properly mounted on the end of a shank without forming a club-foot or like expanded tool-mounting portion. In addition, if a club foot or other expanded-width portion were formed at the end of a shank to support a pair of prior art tool inserts, the club foot or inserts would likely extend into the adjacent tool-supporting station on a commercially-available gang plate, thus preventing every tool station from simultaneously being used and thereby defeating one of the purposes of mounting the two inserts on a common shank.

Yet another advantage of the cutting tools and inserts of the invention is that the two interchangeable inserts mounted on a single shank each may be configured to perform any one of a plurality of different machining operations. Thus, a gang-tooling system of the invention may simultaneously mount on a single gang plate or like tool holder all tools for performing a plurality of different machining operations (such as those described above with reference to FIG. 7) which may be necessary to manufacture one or more different types of workpieces. For example, it may be possible to perform the six different machining operations of FIG. 7 with fewer than six shanks mounted on a single gang plate. This may provide a significant advantage with respect to eliminating downtime which might otherwise be required to install more than one gang plate, or to change the tools mounted on a gang plate to perform all required machining operations on a workpiece.

As will be recognized by those skilled in the pertinent art, numerous changes and modifications may be made to the above-described and other embodiments of the present invention without departing from its scope as defined in the appended claims. Accordingly, this detailed description of a preferred embodiment is to be taken in an illustrative, as opposed to a limiting sense.

What is claimed is:

1. A tool insert for cutting on an automatic lathe, wherein the tool insert is adapted for attachment by a threaded fastener to a tool shank having a tool-supporting end defining a first tool-supporting surface, a second tool-supporting surface oriented at an acute angle relative to the first tool supporting surface and forming a tool recess between the first and second tool-supporting surfaces for receiving and supporting the tool insert, wherein the tool-supporting end of the shank further defines an elongated body portion formed between the second tool-supporting surface and an adjacent side of the tool-supporting end of the shank, and the elongated body portion defines a maximum thickness of at least approximately 1.0 mm, and wherein the maximum width of the portion of the shank extending between an outer end of the first tool-supporting surface and the opposite side of the elongated body portion is less than approximately 9 mm; said tool insert comprising:

four sides defining an approximately rhomboidal shape, wherein the insert defines an inscribed circle having a diameter less than approximately 90% of said maximum width of the portion of the shank extending between the outer end of the first tool-supporting surface and the opposite side of the elongated body portion of the tool-supporting end of the shank, and a fastener aperture extending through the approximate center of the inscribed circle having a diameter less than approximately 70% of the diameter of the inscribed circle, and wherein the rhomboidal-shaped insert is receivable within the tool recess of the tool-supporting end of the shank with two sides of the insert each engaging a respective tool-supporting surface of the shank and a substantial portion of the other two sides of the insert extending outwardly from the shank and forming a cutting tip for cutting a workpiece.

2. A tool insert as defined in claim 1, wherein the two sides of the insert engageable with the tool-supporting surfaces of the shank are oriented at an angle of approximately 35° relative to each other.

3. A tool insert as defined in claim 1, wherein the two sides of the insert which extend outwardly from the shank are oriented at an angle of approximately 35° relative to each other.

4. A tool insert as defined in claim 1, wherein the inscribed circle has a diameter within the range of approximately 5.5 mm through 6.5 mm.

5. A tool insert as defined in claim 1, in combination with:

a tool shank defining a rectangular cross-sectional shape and having a maximum width of less than approximately 9 mm, and including a tool recess defined at one end of the shank by two tool-supporting surfaces oriented at an acute angle relative to each other for receiving and supporting the tool insert, wherein one of the tool-supporting surfaces is oriented approximately parallel to an adjacent side of the shank forming an elongated body portion between the tool recess and the respective side of the shank and having a thickness of at least approximately 1.0 mm; and a threaded fastener extending through the fastener aperture and threadedly attached to the tool shank for fixedly attaching the tool insert to the tool shank, the threaded fastener defining a head having a maximum diameter less than approximately 70% of the diameter of the inscribed circle.

6. A tool insert in combination with a tool shank and fastener as defined in claim 5, wherein the first and second tool-supporting surfaces of the shank are oriented at an angle of approximately 35° relative to each other.

7. A tool insert in combination with a tool shank and fastener as defined in claim 5, wherein the tool shank defines a square cross-sectional shape having a width of either 7 mm or 8 mm.

8. A tool insert in combination with a tool shank and fastener as defined in claim 5, wherein the inscribed circle has a diameter within the range of approximately 5.5 mm through 6.5 mm and the maximum shank width is within the range of approximately 7 mm through 8 mm.

9. A tool insert in combination with a tool shank and fastener as defined in claim 5, wherein the maximum shank width is within the range of approximately 7 mm through 8 mm and the maximum head diameter of the threaded fastener is within the range of approximately 3 mm through 4.5 mm.

10. A tool insert in combination with a tool shank and fastener as defined in claim 5, wherein the threaded fastener is a counter-sunk screw defining a counter-sink angle within the range of approximately 52° through 68°.

11. A tool insert in combination with a tool shank and fastener as defined in claim 10, wherein the counter-sink angle of the threaded fastener is 60°.

12. A tool insert in combination with a tool shank for cutting on an automatic lathe, wherein the tool insert is adapted for attachment by a threaded fastener to the tool shank, the tool shank having a tool-supporting end defining a first tool-supporting surface, a second tool-supporting surface oriented at an acute angle relative to the first tool supporting surface and forming a tool recess between the first and second tool-supporting surfaces for receiving and supporting the tool insert, wherein the tool-supporting end of the shank further defines an elongated body portion formed between the second tool-supporting surface and an adjacent side of the tool-supporting end of the shank, and the elongated body portion defines a maximum thickness of at least approximately 1.0 mm, and wherein the maximum width of the portion of the shank extending between an outer end of the first tool-supporting surface and the opposite side of the elongated body portion is less than approximately 9 mm; said tool insert comprising:

four sides defining an approximately rhomboidal shape, wherein the insert defines an inscribed circle having a diameter less than approximately 90% of said maximum width of the portion of the shank extending between the outer end of the first tool-supporting surface and the opposite side of the elongated body portion of the tool-supporting end of the shank, and a fastener aperture extending through the approximate center of the inscribed circle having a diameter less than approximately 70% of the diameter of the inscribed circle, and wherein the rhomboidal-shaped insert is receivable within the tool recess of the tool-supporting end of the shank with two sides of the insert each engaging a respective tool-supporting surface of the shank and a substantial portion of the other two sides of the insert extending outwardly from the shank and forming a cutting tip for cutting a workpiece said tool shank including a first tool recess formed within a first tool-supporting region located on one side of a tool-supporting end of the shank, and a second tool recess formed within a second tool-supporting region located opposite the first tool-supporting region, wherein each tool recess is defined by a first tool-supporting surface and a second tool supporting surface spaced apart from, and oriented at an acute angle relative to the respective first tool-supporting surface, and each tool recess is adapted to receive and support a respective tool insert between its first and second tool-supporting surfaces; and wherein each tool-supporting region further includes an elongated body portion formed between the respective second tool-supporting surface and an adjacent side of the tool-supporting end of the shank, and each elongated body portion defines a maximum width of at least approximately 1.0 mm; and wherein the maximum width of each tool-supporting region of the shank extending between an outer end of the respective first tool-supporting surface and the opposite side of the respective elongated body portion is less than approximately 9 mm.

13. A tool insert in combination with a tool shank as defined in claim 12, comprising two of said inserts, each being fixedly secured by a respective fastener within a respective tool recess.

14. A tool insert in combination with a tool shank as defined in claim 13, wherein each of said inserts is configured to perform a different one of a plurality of different machining operations relative to the other, and the plurality of machining operations are selected from the group including: grooving, plunge and turn, threading, front turn, back turn and cut off.

15. A tool insert in combination with a tool shank as defined in claim 13, wherein the two inserts are positioned approximately 180° apart from each other, and each insert defines a cutting edge aligned with the centerline of the shank.

16. A tool insert in combination with a tool shank as defined in claim 12, wherein the shank defines an approximately circular cross-sectional configuration for mounting in a gang-tool holder of a gang-tool lathe.

17. A tool insert as defined in claim 12, wherein the two sides of the insert extend transversely outwardly from the shank relative to an axis of the shank.

* * * * *

(12) EX PARTE REEXAMINATION CERTIFICATE (6043rd)
United States Patent
Fountaine

(10) Number: US 6,033,158 C1
(45) Certificate Issued: Dec. 11, 2007

(54) SMALL-SHANK TOOL FOR AUTOMATIC LATHES

(76) Inventor: William R. Fountaine, 12 Rampart Ct., Holyoke, MA (US) 01040

Reexamination Request:
No. 90/006,361, Aug. 20, 2002

Reexamination Certificate for:
Patent No.: 6,033,158
Issued: Mar. 7, 2000
Appl. No.: 09/036,346
Filed: Mar. 6, 1998

Related U.S. Application Data

(63) Continuation-in-part of application No. 08/632,347, filed on Apr. 10, 1996, now Pat. No. 5,779,400.

(51) Int. Cl.
*B23B 27/16* (2006.01)

(52) U.S. Cl. ............... 407/103; 407/66; 407/104
(58) Field of Classification Search ............... None
See application file for complete search history.

(56) References Cited

U.S. PATENT DOCUMENTS

| | | | | |
|---|---|---|---|---|
| 3,731,356 A | * | 5/1973 | Gowanlock | 407/5 |
| 3,755,868 A | * | 9/1973 | LaForge et al. | 407/75 |
| 3,807,007 A | * | 4/1974 | Lindskog | 407/105 |
| 3,812,547 A | * | 5/1974 | Reich | 470/80 |
| 4,188,162 A | * | 2/1980 | Zweekly | 408/199 |
| 4,714,384 A | * | 12/1987 | Lagerberg | 407/103 |
| 5,092,718 A | * | 3/1992 | Shallenberger | 408/188 |

FOREIGN PATENT DOCUMENTS

DE        3730589 A1 * 3/1989

OTHER PUBLICATIONS

ETCO broach, Engineering Tooling Corporation, Mar. 1995.*
MANCHESTER catalog, Manchester Tool Company, 1986.*
Camcar Part ETC 84076SP, Camcar Textron, Jul. 18, 1994.*
Stellram Turning Tools with Indexable Inserts—product catalogue—Stelram Societe anonyme, Squizerland/IPM Precision machinery Corp, Elk Grove Village, Illinois.
Tizit Maxilock S, K, P; Turning tools with positive indexable inserts with hole—product catalogue—Plansee Tooling Ltd., England.

(Continued)

*Primary Examiner*—Minh Nguyen

(57) ABSTRACT

In a small-shank cutting tool for an automatic lathe or like turning machine, the tool shank defines at least one tool-supporting region having a width of less than 9 mm on a tool-supporting end of the shank. The tool-supporting region defines a tool recess formed by two tool-supporting surfaces oriented at an acute angle relative to each other. A rhomboidal-shaped tool insert of the cutting tool is seated within the tool recess of the shank with two sides of the insert each engaging a respective tool-supporting surface of the shank, and a substantial portion of the other two sides of the insert extending beyond the end of the shank and forming a cutting tip for cutting a workpiece. The rhomboidal-shaped insert defines an inscribed circle having a diameter less than approximately 6 mm, and a fastener aperture extending through the approximate center of the inscribed circle defining a diameter less than that of the inscribed circle, in order to provide sufficient space on the tool-supporting region of the shank to form at least two supporting surfaces for engaging and supporting the rhomboidal insert along a substantial portion of each of two sides. A threaded fastener of the cutting tool extends through the fastener aperture and is threadedly attached to the tool shank for fixedly attaching the tool insert to the tool shank. The threaded fastener is preferably a counter-sunk torque screw, and defines a maximum head diameter less than approximately 70% of the diameter of the inscribed circle in order to maintain sufficient structural integrity of the insert to avoid failure during machining operations.

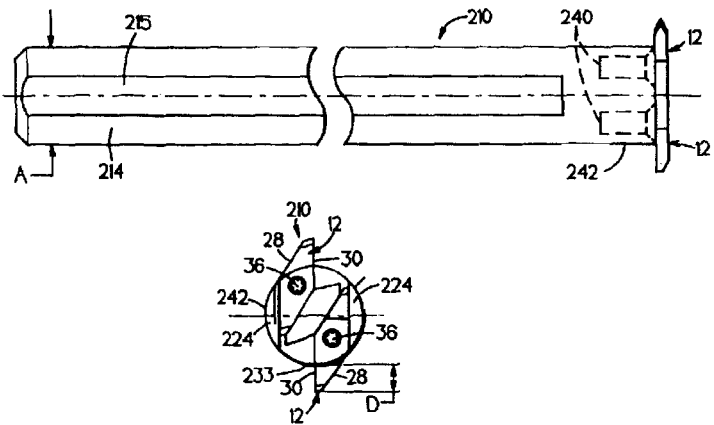

OTHER PUBLICATIONS

Carbide Cutting Tools for the 21st Century—product catalogue—American National Carbide Company, Tomball, Texas.
Grooving and Cut–off Tool–Holder with Tungsten Carbide Inserts—product catalogue—Edo Corporation, New York, NY.
Drawing: SMP–35–C7mm, Engineered Tooling Corporation, Boston, MA (1996).
Drawing: SMP–35T–C8mm, Engineered Tooling Corporation, Boston, MA (1994).
Drawing: SMP–35–X7mm, Engineered Tooling Corporation, Boston, MA (1996).
Drawing: SMP–35T–X8mm, Engineered Tooling Corporation, Boston, MA (1994).
Mar. 1995 ETCO brochure (Ex. 1).
Aug. 1992 NIKCOLE brochure (Ex. 4).
93–9–5 KYOCERA catalog, pp. 5–6, 10–11 (Ex. 6).
1994 KENNAMETAL catalog*, p. 16 (Ex. 8).
1993 ETCO catalog, p. 3 (Ex. 10).
Jan. 1989 ETCO advertisement in METLFAX (Ex. 9).
Mar. 1989 ETCO advertisement.
Feb. 1990 ETCO advertisement in Automatic Machining.
1986 Manchester Tool Company catalog, pp. 40–42 (Ex. 3).
May 1991 ISCAR catalog, pp. 15, 23 (Ex. 13).

* cited by examiner

US 6,033,158 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–13 and 17 are cancelled.

Claims 14–16 are determined to be patentable as amended.

New claims 18–20 are added and determined to be patentable.

14. A tool insert in combination with a tool shank as defined in claim [13] *15*, wherein each of said inserts is configured to perform a different one of a plurality of different machining operations relative to the other, and the plurality of machining operations are selected from the group including: grooving, plunge and turn, threading, front turn, back turn and cut off 15. A tool insert in combination with a tool shank [as defined in claim 13, wherein] *for cutting on an automatic lathe, wherein the tool insert is adapted for attachment by a threaded fastener to the tool shank, the tool shank having an elongated axis, a tool-supporting end defining a first tool-supporting surface, a second tool-supporting surface oriented at an acute angle relative to the first tool supporting surface and forming a tool recess between the first and second tool-supporting surfaces for receiving and supporting the tool insert, wherein the tool-supporting end of the shank further defines an elongated body portion formed between the second tool-supporting surface and an adjacent side of the tool-supporting end of the shank, and the elongated body portion defines a maximum thickness of at least approximately 1.0 mm, and wherein the maximum width of the portion of the shank extending between an outer end of the first tool-supporting surface and the opposite side of the elongated body portion is less than approximately 9 mm; said tool insert comprising:*

*four sides defining an approximately rhomboidal shape, wherein the insert defines an inscribed circle having a diameter less than approximately 90% of said maximum width of the portion of the shank extending between the outer end of the first tool-supporting surface and the opposite side of the elongated body portion of the tool-supporting end of the shank, and a fastener aperture extending through the approximate center of the inscribed circle having a diameter less than approximately 70% of the diameter of the inscribed circle, and wherein the rhomboidal-shaped insert is receivable within the tool recess of the tool-supporting end of the shank with two sides of the insert each engaging a respective tool-supporting surface of the shank and a substantial portion of each of the entire other two sides of the insert extending transversely outwardly from the shank relative to the elongated axis of the shank and forming a cutting tip for cutting a workpiece;*

*said tool shank including a first tool recess formed within a first tool-supporting region located on one side of a tool-supporting end of the shank, and a second tool recess formed within a second tool-supporting region located opposite the first tool-supporting region, wherein each tool recess is defined by a first tool-supporting surface and a second tool supporting surface spaced apart from, and oriented at an acute angle relative to the respective first tool-supporting surface, and each tool recess is adapted to receive and support two sides of a respective rhomboidal-shaped tool insert between its first and second tool-supporting surfaces with a substantial portion of each of the entire other two sides of the insert extending transversely outwardly from the shank relative to the elongated axis of the shank and forming the cutting tip for cutting the workpiece; and wherein each tool-supporting region further includes an elongated body portion formed between the respective second tool-supporting surface and an adjacent side of the tool-supporting end of the shank, and each elongated body portion defines a maximum width of at least approximately 1.0 mm; and wherein the maximum width of each tool-supporting region of the shank extending between an outer end of the respective first tool-supporting surface and the opposite side of the respective elongated body portion is less than approximately 9 mm; and wherein two of said inserts are each fixedly secured by a respective fastener within a respective tool recess, the two inserts are positioned approximately 180° apart from each other, and each insert defines a cutting edge aligned with the centerline of the shank.*

16. A tool insert in combination with a tool shank as defined in claim [12] *15*, wherein the shank defines an approximately circular cross-sectional configuration for mounting in a gang-tool holder of a gang-tool lathe.

*18. A tool insert in combination with a tool shank for cutting on an automatic lathe, wherein the tool insert is adapted for attachment by a threaded fastener to the tool shank, the tool shank having a tool-supporting end defining a first tool-supporting surface, a second tool-supporting surface oriented at an acute angle relative to the first tool supporting surface and forming a tool recess between the first and second tool-supporting surfaces for receiving and supporting the tool insert, and an end surface formed adjacent to the first and second tool supporting surfaces, wherein the tool-supporting end of the shank further defines an elongated body portion formed between the second tool-supporting surface and an adjacent side of the tool-supporting end of the shank, and the elongated body portion defines a maximum thickness of at least approximately 1.0 mm, and wherein the maximum width of the portion of the shank extending between an outer end of the first tool-supporting surface and the opposite side of the elongated body portion is less than approximately 9 mm; said tool insert comprising:*

*four sides defining an approximately rhomboidal shape, wherein the insert defines an inscribed circle having a diameter less than approximately 90% of said maximum width of the portion of the shank extending between the outer end of the first tool-supporting surface and the opposite side of the elongated body portion of the tool-supporting end of the shank, and a fastener aperture extending through the approximate center of the inscribed circle having a diameter less than approximately 70% of the diameter of the inscribed circle, and wherein the rhomboidal-shaped* insert defines adjacent pairs of first and second sides, each pair of sides is located on an opposite side of the insert relative to the other pair of sides, each pair of sides forms a respective cutting tip having a depth (D), and each pair of sides is receivable within the tool recess of the tool-supporting end of the shank with the two sides of the respective pair each engaging a respective tool-supporting surface of the shank, and a substantial portion of the other pair of sides of the insert extending outwardly from the shank with substantially the entire depth (D) of the respective cutting tip extending beyond the end surface of the shank and forming the cutting tip for cutting a workpiece;

said tool shank including a first tool recess formed within a first tool-supporting region located on one side of a tool-supporting end of the shank, and a second tool recess formed within a second tool-supporting region located opposite the first tool-supporting region, wherein each tool recess is defined by a first tool-supporting surface and a second tool supporting surface spaced apart from, and oriented at an acute angle relative to the respective first tool-supporting surface, and an end surface formed adjacent to the first and second tool supporting surfaces, and each tool recess is adapted to receive and support a pair of sides of a respective tool insert between its first and second tool-supporting surfaces with the two sides of the respective pair each engaging a respective tool-supporting surface of the shank, and a substantial portion of the other pair of sides of the insert extending outwardly from the shank with substantially the entire depth (D) of the respective cutting tip extending beyond the end surface of the shank; and wherein each tool-supporting region further includes an elongated body portion formed between the respective second tool-supporting surface and an adjacent side of the tool-supporting end of the shank, and each elongated body portion defines a maximum width of at least approximately 1.0 mm; and wherein the maximum width of each tool-supporting region of the shank extending between an outer end of the respective first tool-supporting surface and the opposite side of the respective elongated body portion is less than approximately 9 mm; wherein the shank defines a centerline, and wherein two of said inserts are each fixedly secured by a respective fastener within a respective tool recess, and each insert includes one side extending outwardly from the shank beyond the end surface of the shank and defining a cutting edge that is aligned with the centerline of the shank and with the corresponding edge of the other insert.

19. A tool insert in combination with a tool shank for cutting on an automatic lathe, wherein the tool insert is adapted for attachment by a threaded fastener to the tool shank, the tool shank having a tool-supporting end defining a first tool-supporting surface, a second tool-supporting surface oriented at an acute angle relative to the first tool supporting surface and forming a tool recess between the first and second tool-supporting surfaces for receiving and supporting the tool insert, wherein the tool-supporting end of the shank further defines an elongated body portion formed between the second tool-supporting surface and an adjacent side of the tool-supporting end of the shank, and the elongated body portion defines a maximum thickness of at least approximately 1.0 mm, and wherein the maximum width of the portion of the shank extending between an outer end of the first tool-supporting surface and the opposite side of the elongated body portion is less than approximately 9 mm; said tool insert comprising:

four sides defining an approximately rhomboidal shape, wherein the insert defines an inscribed circle having a diameter less than approximately 90% of said maximum width of the portion of the shank extending between the outer end of the first tool-supporting surface and the opposite side of the elongated body portion of the tool-supporting end of the shank, and a fastener aperture extending through the approximate center of the inscribed circle having a diameter less than approximately 70% of the diameter of the inscribed circle, and wherein the rhomboidal-shaped insert is receivable within the tool recess of the tool-supporting end of the shank with two sides of the insert each engaging a respective tool-supporting surface of the shank and a substantial portion of the other two sides of the insert extending outwardly from the shank and forming a cutting tip for cutting a workpiece;

said tool shank including a first tool recess formed within a first tool-supporting region located on one side of a tool-supporting end of the shank, and a second tool recess formed within a second tool-supporting region located opposite the first tool-supporting region, wherein each tool recess is defined by a first tool-supporting surface and a second tool supporting surface spaced apart from, and oriented at an acute angle relative to the respective first tool-supporting surface, and each tool recess is adapted to receive and support a respective tool insert between its first and second tool-supporting surfaces; and wherein each tool-supporting region further includes an elongated body portion formed between the respective second tool-supporting surface and an adjacent side of the tool-supporting end of the shank, and each elongated body portion defines a maximum width of at least approximately 1.0 mm; and wherein the maximum width of each tool-supporting region of the shank extending between an outer end of the respective first tool-supporting surface and the opposite side of the respective elongated body portion is less than approximately 9 mm;

and wherein two of said inserts are each fixedly secured by a respective fastener within a respective tool recess, the two inserts are positioned approximately 180° apart from each other, and each insert defines a cutting edge aligned with the centerline of the shank.

20. A tool insert in combination with a tool shank as defined in claim 19, wherein each of the first and second tool supporting surfaces defines an inner end and an outer end, and the outer end is oriented tangential to the inscribed circle of a tool insert received within the respective tool recess.

\* \* \* \* \*